(12) United States Patent
Woo et al.

(10) Patent No.: US 9,590,214 B2
(45) Date of Patent: Mar. 7, 2017

(54) SECONDARY BATTERY STRUCTURE

(71) Applicant: LG CHEM, LTD., Seoul (KR)

(72) Inventors: Sang Jin Woo, Daejeon (KR); Hang Seob Yoon, Daejeon (KR); Tae Won Kang, Daejeon (KR); Jeoung Soo Kim, Daejeon (KR); Sin Young Park, Daejeon (KR); Sang Bong Nam, Daejeon (KR); Hyang Mok Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 102 days.

(21) Appl. No.: 14/293,540

(22) Filed: Jun. 2, 2014

(65) Prior Publication Data
US 2014/0272548 A1 Sep. 18, 2014

Related U.S. Application Data

(63) Continuation of application No. PCT/KR2013/011725, filed on Dec. 17, 2013.

(30) Foreign Application Priority Data

Jan. 18, 2013 (KR) ........................ 10-2013-0006033

(51) Int. Cl.
*H01M 2/06* (2006.01)
*H01M 2/08* (2006.01)
(Continued)

(52) U.S. Cl.
CPC ......... *H01M 2/022* (2013.01); *H01M 2/0404* (2013.01); *H01M 2/0473* (2013.01);
(Continued)

(58) Field of Classification Search
CPC .................................. H01M 2/02; H01M 2/06
(Continued)

(56) References Cited

U.S. PATENT DOCUMENTS 7,666,547 B2 2/2010 Urano et al.
2006/0073382 A1* 4/2006 Urano et al. .................. 429/161
(Continued)

FOREIGN PATENT DOCUMENTS

CN 1755964 A 4/2006
JP 2001-210384 A 8/2001
(Continued)

OTHER PUBLICATIONS

International Search Report issued in PCT/KR2013/011725, mailed on Mar. 26, 2014.
(Continued)

*Primary Examiner* — James Lee
(74) *Attorney, Agent, or Firm* — Birch, Stewart, Kolasch & Birch, LLP

(57) ABSTRACT

The present invention relates to a secondary battery structure. The secondary battery structure includes: a can; an electrode assembly accommodated in the can, the electrode assembly including a cathode tab and an anode tab; a cap plate sealing an opened upper end of the can; and an upper insulator disposed between the can and the cap plate, the upper insulator having a cathode tab hole for the cathode tab, an anode tab hole for the anode tab, and an injection/impregnation hole for injecting and impregnating, wherein each of the cathode tab hole, the anode tab hole, and the injection/impregnation hole extends in a length or width direction of the upper insulator and is symmetrical with respect to at least one of a line (a) that equally divides the upper insulator in a width direction and a line (b) that equally divides the upper insulator in a length direction.

8 Claims, 2 Drawing Sheets

(51) Int. Cl.
*H01M 2/02* (2006.01)
*H01M 10/04* (2006.01)
*H01M 10/052* (2010.01)
*H01M 10/0587* (2010.01)
*H01M 2/04* (2006.01)

(52) U.S. Cl.
CPC ......... *H01M 2/06* (2013.01); *H01M 10/0431* (2013.01); *H01M 10/0436* (2013.01); *H01M 10/052* (2013.01); *H01M 10/0587* (2013.01); *H01M 2/0408* (2013.01)

(58) Field of Classification Search
USPC .......................................................... 429/174
See application file for complete search history.

(56) References Cited

U.S. PATENT DOCUMENTS

| 2006/0115726 | A1* | 6/2006 | Jung et al. ................. 429/181 |
| 2007/0190411 | A1 | 8/2007 | Uh |
| 2008/0274402 | A1 | 11/2008 | Uh |
| 2009/0087738 | A1 | 4/2009 | Kim |
| 2009/0311593 | A1 | 12/2009 | Park |
| 2012/0141861 | A1* | 6/2012 | Uchida ............... H01M 2/0404 429/159 |

FOREIGN PATENT DOCUMENTS

| JP | 2001-273932 A | 10/2001 |
| JP | 2006-100097 A | 4/2006 |
| JP | 2007-188711 A | 7/2007 |
| JP | 2011-204469 A | 10/2011 |
| KR | 10-0816218 B1 | 3/2008 |
| KR | 10-0867929 B1 | 11/2008 |
| KR | 10-2009-0130657 A | 12/2009 |

OTHER PUBLICATIONS

Chinese Office Action and Search Report, dated Oct. 29, 2015, for Chinese Application No. 201380003911.3, with an English translation.

* cited by examiner

SECONDARY BATTERY STRUCTURE

CROSS REFERENCE TO RELATED APPLICATIONS

This application is a continuation of PCT international Application No. PCT/KR2013/011725 filed on Dec. 17, 2013, which claims priority under 35 U.S.C 119(a) to Application No. 10-2013-0006033 filed on Jan. 18, 2013 in the Republic of Korea, all of which are hereby expressly incorporated by reference into the present application.

TECHNICAL FIELD

The present invention relates to a secondary battery structure, and more particularly, to a secondary battery structure in which an upper insulator applied to a secondary battery is improved in structure to improve bending resistance and assemblability.

BACKGROUND ART

In general, unlike primary batteries that are not chargeable, secondary batteries denote batteries that are chargeable and dischargeable. Secondary batteries are being widely used in high-tech electronic devices such as cellular phones, notebook, computers, camcorders, and the like. Particularly, lithium secondary batteries, which have an operating voltage of 3.6 V, are being actively developed. This is because the operating voltage of the lithium secondary batteries is approximately three times higher than that of nickel-cadmium batteries or nickel-hydride batteries, which are widely used power sources for electronic devices and because the lithium secondary batteries have excellent energy density per unit weight.

Such a lithium secondary battery generally employs a lithium-based oxide as a cathode active material and a carbon material as an anode active material. In general, the lithium secondary batteries are classified into liquid electrolyte batteries and polymer electrolyte batteries. Batteries using a liquid electrolyte are referred to as lithium-ion batteries, and batteries using a polymer electrolyte are referred to as lithium-polymer batteries. Also, the lithium secondary batteries are manufactured in various shapes such as cylindrical, prismatic, and pouch shapes.

FIGS. 1 to 4 are views of an upper insulator of a secondary battery according to the related art.

As illustrated in FIGS. 1 and 2, a secondary battery according to a first embodiment of the related art includes a can, an electrode assembly accommodated in the can and constituted by a cathode tab, a separator, and an anode tab, a cap plate coupled to an opened upper end of the can to seal the upper end of the can, and an upper insulator 10 disposed under the cap plate and having a hole passing through the cathode tab and the anode tab.

Here, the upper insulator 10 has a prismatic shape. Also, the upper insulator 10 has an anode tab hole 11 for the anode tab, an injection/impregnation hole 12 for injecting and impregnating, and a cathode tab hole 13 for the cathode tab in an upper portion thereof.

However, in the upper insulator 10 of the secondary battery according to the first embodiment of the related art, the anode tab hole 11, the cathode tab hole 13, and the injection/impregnation hole 12 are eccentrically formed. Thus, stress may be concentrated into a portion having relatively low resistance against the external force to cause defects in the upper insulator. Furthermore, if the upper insulator 10 is misaligned in front and rear or left and right directions, it may be difficult to assemble the upper insulator 10. As a result, it is cumbersome to assembly the upper insulator 10 in a state where the upper insulator 10 is aligned in the same direction.

Thus, as illustrated in FIGS. 3 and 4, an upper insulator 10 of a secondary battery according to a second embodiment of the related art has an injection/impregnation hole 12 and an anode tab hole 11, which have the same size, to improve assemblability and bending resistance. However, since the injection/impregnation hole 12 is narrow in space and deteriorated in workability, and also, the cathode tab hole 13 is eccentrically formed, the assemblability may be deteriorated, like the first embodiment.

DISCLOSURE OF THE INVENTION

Technical Problem

The technical solution of the present invention for solving the above-described problems is to provide a secondary battery structure in which an upper insulator is improved in structure to increase strength against bending stress and is assemble, regardless of front and rear or left and right directions.

Technical Solution

To solve the above technical problems, the present invention provides a secondary battery structure including: a can; an electrode assembly accommodated in the can, the electrode assembly including a cathode tab and an anode tab; a cap plate sealing an opened upper end of the can; and an upper insulator disposed between the can and the cap plate, the upper insulator having a cathode tab hole for the cathode tab, an anode tab hole for the anode tab, and an injection/impregnation hole for injecting and impregnating, wherein each of the cathode tab hole, the anode tab hole, and the injection/impregnation hole extends in a length or width direction of the upper insulator and is symmetrical with respect to at least one of a line (a) that equally divides the upper insulator in a width direction and a line (b) that equally divides the upper insulator in a length direction.

Each of the cathode tab hole, the anode tab hole, and the injection/impregnation hole may extend in the length or width direction of the upper insulator and is symmetrical with respect to a line (c) that equally divides the upper insulator in a thickness direction.

The anode tab hole may be defined in a center of a top surface of the upper insulator, and the injection/impregnation hole may be provided in plurality on both sides of the upper insulator in the length direction with the anode tab hole therebetween, and the cathode tab hole may be provided in at least one on both sides of the upper insulator in the width direction with the injection/impregnation hole therebetween.

A reinforcing piece may be disposed along a circumference of each of top and bottom surfaces of the upper insulator.

The reinforcing piece may extend in the length or width direction of the upper insulator and be symmetrical with respect to the (c) that equally divides the upper insulator in the thickness direction.

The cathode tab hole may be opened in the width direction of the upper insulator.

A cutoff member for finishing the cathode tab hole may be disposed on the cathode tab hole, and a portion of the cutoff member may be separably connected to the cathode tab hole.

The cutoff member may be integrally manufactured with the upper insulator when the upper insulator is manufactured.

The anode tab hole may have a prismatic shape, and the injection/impregnation hole may have a circular or oval shape.

Advantageous Effects

According to the present invention, since the improved upper insulator having the symmetrical structure is applied to the secondary battery, convenience in assembly may be improved, and the bending resistance and the supporting reaction force may be maximized to improve the merchantable quality of the upper insulator.

MODE FOR CARRYING OUT THE INVENTION

Figure 1:
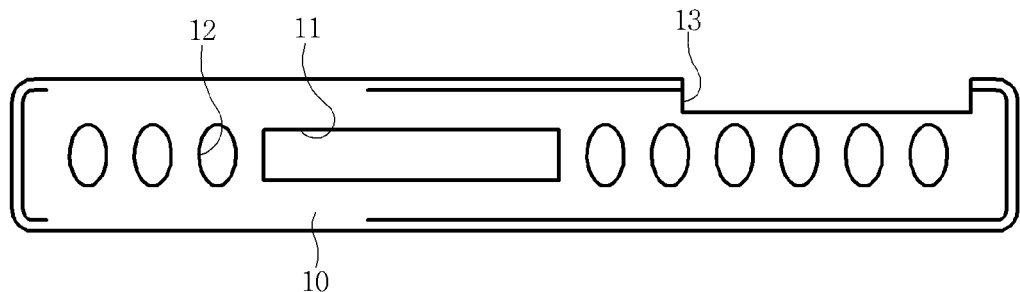
FIG. 1 is a view of an upper insulator of a secondary battery according to a first embodiment of a related art.
Figure 2:
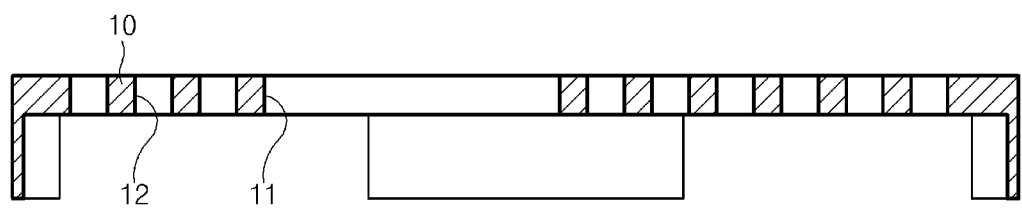
FIG. 2 is a cross-sectional view of FIG. 1.
Figure 3:
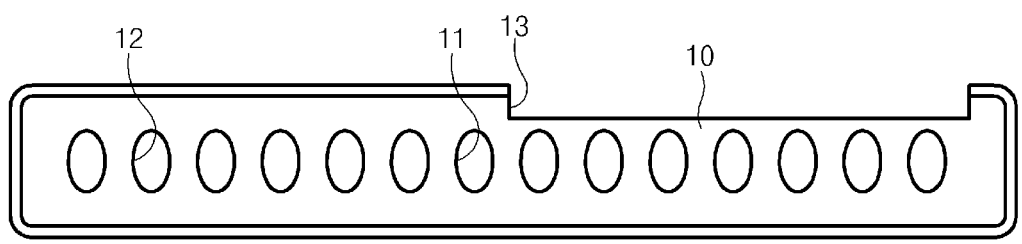
FIG. 3 is a view of an upper insulator of a secondary battery according to a second embodiment of the related art.
Figure 4:
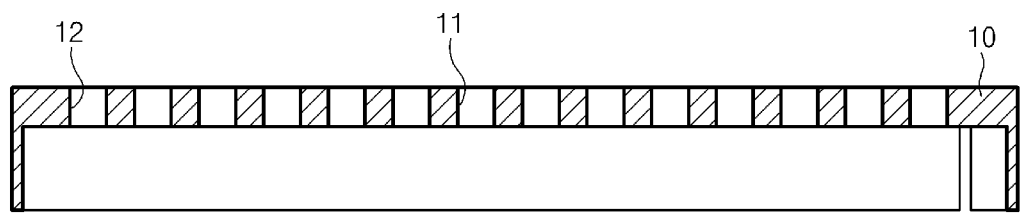
FIG. 4 is a cross-sectional view of FIG. 3.

An upper insulator of a secondary battery according to the present invention may have a symmetrical structure in width, length, and thickness with respect to a central line thereof to improve manufacturability, assemblability, and compatibility.

Hereinafter, embodiments of the present invention will be described in detail with reference to the accompanying drawings so that those skilled in the art can easily work with the embodiments. The present invention may, however, be embodied in different forms and should not be construed as limited to the embodiments set forth herein. In the drawings, anything unnecessary for describing the present invention will be omitted for clarity, and also like reference numerals in the drawings denote like elements.

Although not shown, a secondary battery structure according to the first embodiment of the present invention includes a can having an opened upper portion, an electrode assembly accommodated in the can and including a cathode tab and an anode tab, a cap plate for sealing the opened portion end of the can, and an upper insulator 100 disposed between the can and the cap plate and having a cathode tab hole 130 for the cathode tab, an anode tab hole 110 for the anode tab, and an injection/impregnation hole 120 for injecting and impregnating.

Figure 5:
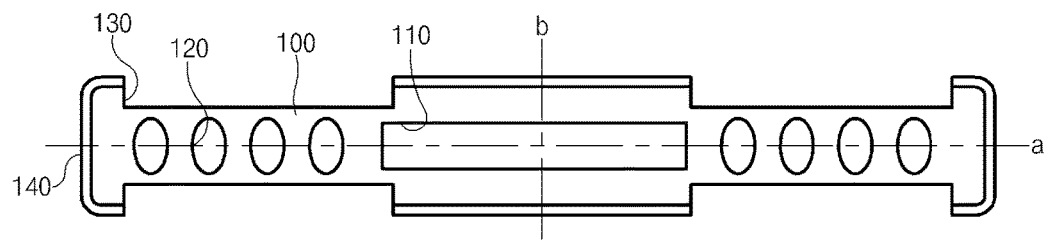
FIG. 5 is a plan view of an upper insulator of a secondary battery according to a first embodiment of the present invention.
Figure 6:
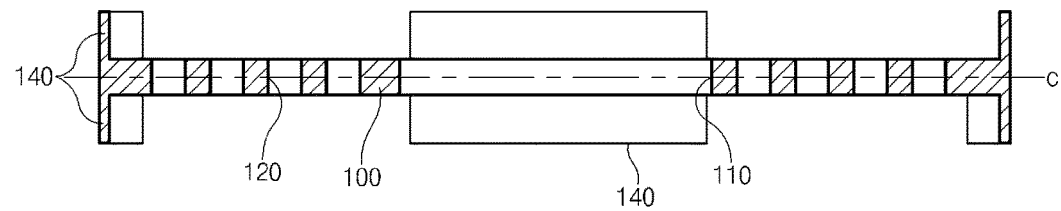
FIG. 6 is a cross-sectional view of the upper insulator of the secondary battery according to the first embodiment of the present invention.

Here, as illustrated in FIGS. 5 and 6, the upper insulator 100 may have a structure in which the anode tab hole 110, the injection/impregnation hole 120, and the cathode tab hole 130 are symmetrical with respect to a central line of the upper insulator 100 in width, length, and thickness directions.

For example, each of the anode tab hole 110, the injection/impregnation hole 120, and the cathode tab hole 130 extends in the length or width direction of the upper insulator 100 to provide a symmetrical structure with respect to at least one of a line a that equally divides the upper insulator 100 in the width direction and a line b that equally divides the upper insulator 100 in the length direction (see FIG. 5).

That is, the anode tab hole 110 is formed in a center of a top surface of the upper insulator 100 and is symmetrical with respect to the line a or b which is illustrated in FIG. 5.

The anode tab hole 110 has a prismatic shape that extends in the length direction of the upper insulator 100. Thus, a space having more wide area may be secured in the upper insulator 100.

The injection/impregnation hole 120 may be provided in plurality at both sides of the upper insulator 100 in the length direction with the anode tab hole 110 therebetween and is symmetrical with respect to the line a or b which is illustrated in FIG. 5.

The injection/impregnation hole 120 may have a circular or oval shape. That is, if the injection/impregnation hole 120 has the circular shape, a symmetrical property may be improved. Also, if the injection/impregnation hole 120 has the oval shape, more wide width may be secured to improve workability. Furthermore, when the injection/impregnation holes 120 are arranged in an oval shape in comparison with a circular shape, the number of injection/impregnation holes 120 may be reduced to obtain easy manufacture.

The cathode tab hole 130 may be provided in at least one on both sides of the upper insulator 100 in the width direction with the injection/impregnation hole 120 therebetween and is symmetrical with respect to the line a or b which is illustrated in FIG. 5.

Here, as illustrated in FIG. 5, the cathode tab hole 130 may be provided in two on each of both sides of the upper insulator 100, i.e., provided in four on both sides of the upper insulator 100 in the width direction with the injection/impregnation hole 120 therebetween to improve convenience in use and increase strength against bending stress.

Also, the cathode tab hole 130 may be opened in the width direction of the upper insulator 100 to improve efficiency when the cathode tab passes therethrough.

Thus, the anode tab holes 110, the injection/impregnation holes 120, and the cathode tab holes 130 may be symmetrical with respect to the line a or b which is expressed on the upper insulator 100, and thus, the upper insulator 100 may be assemble in any direction.

Also, each of the anode tab holes 110, the injection/impregnation holes 120, and the cathode tab holes 130 may extend in the length or width direction of the upper insulator 100 and thus be symmetrical with respect to a line c that equally divides the upper insulator 100 in the thickness direction (see FIG. 6).

That is, front and rear surfaces of the upper insulator 100 may be symmetrical with each other. Thus, the upper insulator 100 may be utilized regardless of the front and rear surface thereof. That is, since it is unnecessary to consider overturning of the upper insulator 100, the number of assembly processes may be reduced, and yield may be improved.

A reinforcing piece 140 is disposed along a circumference of each of top and bottom surfaces of the upper insulator 100 to increase strength of the upper insulator 100.

Here, the reinforcing piece 140 extends in the length or width of the upper insulator 100 and thus is symmetrical with respect to the line c that equally divides the upper insulator 100 in the thickness direction. Thus, when the upper insulator 100 is assembled, it may prevent the upper insulator 100 from being changed in left and right sides or overturned.

As described above, the anode tab holes 110, the injection/impregnation holes 120, and the cathode tab holes 130 of the upper insulator 100 are symmetrical with respect to at least one line of the lines a, b, and c, which are illustrated in FIGS. 5 and 6, to prevent the upper insulator 100 from being changed in left and right sides or overturned, thereby improving assemblability. In addition, since four surfaces of the upper insulator 100 have the same bending stress, the bending of the upper insulator 100 may be prevented.

Hereinafter, in description of a secondary battery structure according to another embodiment of the present invention, components which are equal or similar to those of the first embodiment are indicated by the same numeral references, and thus duplicate description thereof will be omitted.

Figure 7:
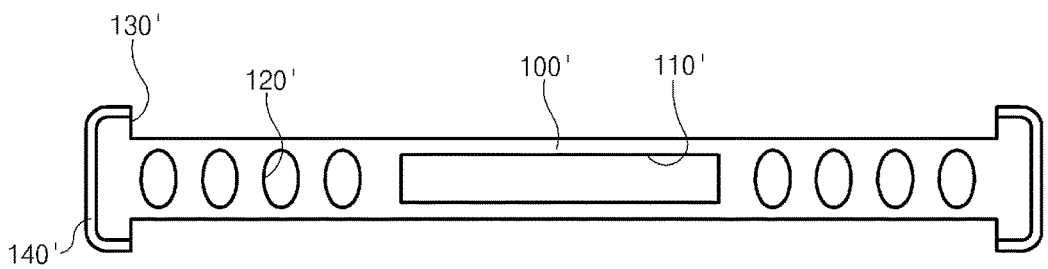
FIG. 7 is a plan view of an upper insulator of a secondary battery according to a second embodiment of the present invention.

FIG. 7 is a view of a secondary battery structure according to a second embodiment of the present invention.

As illustrated in FIG. 7, in the secondary battery structure according to the second embodiment, a cathode tab hole 130' may be provided in each of both sides of an upper insulator 100' in a width direction with an injection/impregnation hole 120' therebetween, like the first embodiment. Thus, the upper insulator 100' may be easily manufactured, and more wide area may be secured in the upper insulator 100' to improve workability and compatibility when a cathode tab passes therethrough.

Figure 8:
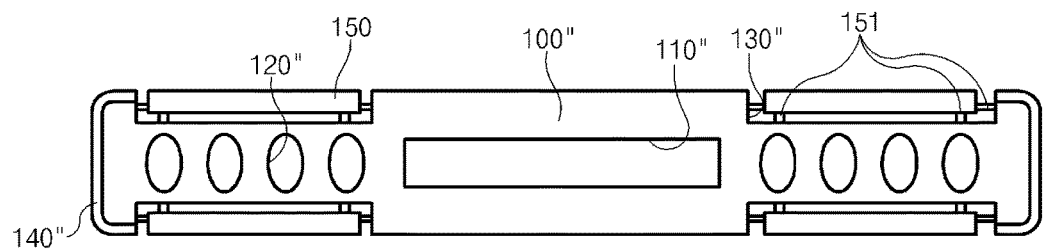
FIG. 8 is a plan view of an upper insulator of a secondary battery according to a third embodiment of the present invention.

FIG. 8 is a view of a secondary battery structure according to a third embodiment of the present invention.

As illustrated in FIG. 8, the secondary battery structure according to the third embodiment may be a modified example of the cathode tab hole according to the first embodiment. A cutoff member 150 for finishing a cathode tab hole 130" may be further provided on the cathode tab hole 130" formed in an upper insulator 100". A portion of the cutoff member 150 is formed as a cutoff part 151 connected to the cathode tab hole 130". Thus, as the cutoff part 151 is cut, the cutoff member 150 may be separated from the cathode tab hole 130".

That is, in the secondary battery structure according to the third embodiment, the cutoff member 150 may be provided on the cathode tab hole 130" to increase strength against bending resistance. In addition, when a cathode tab passes through the cathode tab hole 130", only the cutoff member 150 disposed on the corresponding cathode tab hole 130" may be cut to minimize the reduction in strength against the bending resistance.

Here, the cutoff member 150 may be integrally manufactured with the upper insulator 130" when the upper insulator 130" is manufactured to ensure ease of manufacture.

The scope of the present invention is defined by the following claims rather than the detailed description. It should be understood that all modifications or variations derived from the meaning and range of the claims and equivalents of the claims are included in the scope of the present invention.

The invention claimed is:

1. An upper insulator configured to be disposed between a can of a secondary battery and a cap plate sealing an opened upper end of the can, the upper insulator comprising:
   one or more than one cathode tab hole for a cathode tab;
   one or more than one anode tab hole for an anode tab; and
   one or more than one injection/impregnation hole for injecting and impregnating,
   wherein each of the one or more than one cathode tab hole, the one or more than one anode tab hole, and the one or more than one injection/impregnation hole extends in a length direction of the upper insulator to be symmetrical with respect to a line (a) that equally divides the upper insulator in a width direction, extends in the width direction of the upper insulator to be symmetrical with respect to a line (b) that equally divides the upper insulator in the length direction, or extends in both the length and width directions of the upper insulator to be symmetrical with respect to the lines (a) and (b),
   wherein a cutoff member for finishing the one or more than one cathode tab hole is disposed on the one or more than one cathode tab hole, and a portion of the cutoff member is separably connected to the one or more than one cathode tab hole,
   wherein the one or more than one cathode tab hole is provided at a perimeter of the upper insulator such that one side thereof is open,
   wherein the cutoff member is disposed where the one or more than one cathode tab hole is opened, and
   wherein the cutoff member is joined to the upper insulator by one or more cutoff parts in the one or more cathode tab hole.

2. The upper insulator of claim 1, wherein each of the one or more than one cathode tab hole, the one or more than one anode tab hole, and the one or more than one injection/impregnation hole extends in the length or width direction of the upper insulator and is symmetrical with respect to a line (c) that equally divides the upper insulator in a thickness direction.

3. The upper insulator of claim 2, wherein the one or more than one anode tab hole is defined in a center of the upper insulator, and the one or more than one injection/impregnation hole is provided in plurality on both sides of the upper insulator in the length direction with the one or more than one anode tab hole therebetween, and the one or more than one cathode tab hole is provided in at least one on both sides of the upper insulator in the width direction with the one or more than one injection/impregnation hole therebetween.

4. The upper insulator of claim 1, wherein a reinforcing piece is disposed along a circumference of each of top and bottom surfaces of the upper insulator.

5. The upper insulator of claim 4, wherein the reinforcing piece extends in the length or width direction of the upper insulator and is symmetrical with respect to a line (c) that equally divides the upper insulator in a thickness direction.

6. The upper insulator of claim 1, wherein the cutoff member is integrally manufactured with the upper insulator when the upper insulator is manufactured.

7. The upper insulator of claim 1, wherein the one or more than one anode tab hole has a prismatic shape, and
   the one or more than one injection/impregnation hole has a circular or oval shape.

8. A secondary battery structure comprising:
   a can;
   an electrode assembly accommodated in the can, the electrode assembly comprising a cathode tab and an anode tab;

a cap plate sealing an opened upper end of the can; and an upper insulator disposed between the can and the cap plate, the upper insulator having:

two or more cathode tab holes capable of receiving the cathode tab;

one or more than one anode tab hole capable of receiving the anode tab; and one or more than one injection/impregnation hole for injecting and impregnating, wherein each of the two or more cathode tab holes, the one or more than one anode tab hole, and the one or more than one injection/impregnation hole extends in a length direction of the upper insulator to be symmetrical with respect to a line (a) that equally divides the upper insulator in a width direction, extends in the width direction of the upper insulator to be symmetrical with respect to a line (b) that equally divides the upper insulator in the length direction, or extends in both the length and width directions of the upper insulator to be symmetrical with respect to the lines (a) and (b), wherein a cutoff member for finishing all but one cathode tab hole of the two or more cathode tab holes is provided such that one or more remaining cathode tab holes each have the cutoff member, and a portion of the cutoff member is separably connected to the one or more remaining cathode tab holes, wherein the two or more cathode tab holes are provided at a perimeter of the upper insulator such that one side thereof is open, wherein the cutoff member is disposed where the one or more remaining cathode tab holes is opened, and wherein the cutoff member is joined to the upper insulator by one or more cutoff parts in the one or more remaining cathode tab holes.

* * * * *